(12) United States Patent
Ni

(10) Patent No.: US 6,758,048 B1
(45) Date of Patent: Jul. 6, 2004

(54) MICROTURBINE-DRIVEN INTEGRATED AIR-CONDITIONING SYSTEM

(75) Inventor: Li Ni, Redondo Beach, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/248,525

(22) Filed: Jan. 27, 2003

(51) Int. Cl.[7] .......................... F25D 17/06; F25D 23/00; F25B 27/00; F25B 17/08
(52) U.S. Cl. ........................... 62/94; 62/238.3; 62/480; 62/271
(58) Field of Search ..................... 62/94, 238.3, 271, 62/480

(56) References Cited

U.S. PATENT DOCUMENTS

| | | | | |
|---|---|---|---|---|
| 4,691,530 A | * | 9/1987 | Meckler | 62/238.1 |
| 4,987,750 A | * | 1/1991 | Meckler | 62/238.6 |
| 5,146,978 A | * | 9/1992 | Albers et al. | 165/111 |
| 5,291,750 A | * | 3/1994 | Parrish et al. | 62/259.3 |
| 5,477,706 A | * | 12/1995 | Kirol et al. | 62/480 |
| 5,555,738 A | * | 9/1996 | DeVault | 62/238.3 |
| 6,205,796 B1 | * | 3/2001 | Chu et al. | 62/94 |
| 6,360,557 B1 | * | 3/2002 | Reznik | 62/402 |
| 6,519,946 B2 | * | 2/2003 | Iwamoto et al. | 60/784 |

OTHER PUBLICATIONS

1998 International Gas Research Conference, Title "Development of a Small–Scale Directly Gas–Fired Integrated HVAC System", by Prof. Dr.–Ing. G. Schmitz and Dipl.–Ing. R. Mockel; pp. 771–777.

\* cited by examiner

Primary Examiner—William C. Doerrler
Assistant Examiner—Filip Zec
(74) Attorney, Agent, or Firm—Sutherland Asbill & Brennan LLP

(57) ABSTRACT

A system for conditioning air. The system may include a turbine for generating waste heat and a desiccant system for removing humidity from the air. The desiccant system may be in communication with the turbine so as to use the waste heat for regeneration. The system also may include a cooling system so as to cool the air after the air passes through the desiccant system.

18 Claims, 2 Drawing Sheets

MICROTURBINE-DRIVEN INTEGRATED AIR-CONDITIONING SYSTEM

BACKGROUND OF INVENTION

Technical Field

The present invention relates generally to an air-conditioning system and more particularly relates to an air-conditioning system using the waste heat from a microturbine to regenerate a desiccant system.

A HVAC system (Heating, Ventilating, and Air-conditioning) generally includes three components or goals: (1) temperature management, (2) humidity management, and (3) air quality management. Temperature management generally may be achieved with a basic dry bulb thermostat coupled to a furnace and an air-conditioning system. The thermostat may accurately indicate when the furnace or the air-conditioning system should be activated.

Although the thermostat may manage the temperature of the air, the thermostat generally does not take into account the humidity level. Rather, humidity control generally may be accomplished by cooling the intake air below its dew point. The humidity within the air may then be condensed and removed from the system as a liquid. Once the humidity has been condensed, however, the air generally should be reheated before use so as to bring the air back to a comfortable temperature. Although this technique may remove a sufficient amount of humidity from the air stream, the energy requirements may be significant given the need to lower the air temperature below the desired temperature and then reheat the air.

Similarly, exhausting the spent interior air or mixing only a portion of the interior air with the intake air, as opposed to reusing the conditioned air, generally accomplishes air quality management. Specifically, most of the spent interior air is exhausted back to the environment and fresh intake air is chilled as described above. Again, this method is effective in maintaining air quality although it may be energy intensive.

An alternative method of humidity control is the use of a desiccant system. In a desiccant system, the intake air may pass through a desiccant wheel before being cooled. The desiccant wheel may include a desiccant material such as a silica gel, titanium silicates, or some type of zeolite (hydrous silicates). The desiccant material absorbs all or part of the humidity in the air. As the desiccant material becomes saturated with the humidity in the incoming air stream, the wheel is rotated and the humidity may be expelled with an opposing stream of hot air. The hot air dries or "regenerates" the material such that it is again ready for use. A heating device of some sort generally may produce the hot air stream. The desiccant wheel may be continually rotated such that one portion is absorbing the humidity from the incoming air stream and one portion is releasing the humidity in the regeneration air stream.

Once the incoming air stream has been stripped of its humidity, the air stream then may be chilled to the desired temperature via a conventional cooling system. Because the temperature of the air need not be reduced as far as is required in traditional systems to reduce the humidity level, the air stream may not need to be reheated so as to bring the air back up to a comfortable temperature.

There is a desire therefore to provide a HVAC system with efficient use of a desiccant system so as to provide improved temperature and humidity control. The HVAC system preferably can provide these improvements in a less energy intensive manner than known systems while also being cost effective in terms of installation and use.

SUMMARY OF INVENTION

The present invention thus provides a system for conditioning air. The system may include a turbine for generating waste heat and a desiccant system for removing humidity from the air. The desiccant system may be in communication with the turbine so as to use the waste heat for regeneration. The system also may include a cooling system so as to cool the air after the air passes through the desiccant system.

The turbine may include a microturbine and may be driven by natural gas. The turbine may generate waste heat of about 150° to about 540° Celsius (about 300° to about 1000 F.). The turbine also may generate electrical power. The desiccant system may include a desiccant wheel. The desiccant system may include a humidity control system for adjusting the relative humidity level. The cooling system may include a cooling coil. The cooling system may include a temperature control system for adjusting the temperature level.

The system further may include one or more intake ducts so as to direct the air through the desiccant system and the cooling system and into a space for conditioning. Likewise, the system may include one or more return ducts so as to direct the air from the space. One or more recirculation ducts may be positioned so as to direct the air from the return ducts to the intake ducts. A heat exchanger may be positioned between the desiccant wheel and the cooling system so as to exchange heat between the air in the intake ducts and the recirculation ducts. The heat exchanger may include a heat wheel. The heat wheel may include a desiccant material.

A further embodiment of the present invention may provide an air system for conditioning ambient air for a predetermined space. The system may include microturbine generation means for generating waste heat and desiccant means for removing humidity from the ambient air. The desiccant means may be in communication with the generation means so as to use the waste heat for regeneration. The system also may include cooling means for cooling the ambient air after the ambient air passes through the desiccant means.

A further embodiment of the present invention may provide an air-conditioning system. The air conditioning system may a microturbine for generating electrical power and a waste heat stream and a desiccant wheel for removing humidity from an incoming air stream. The desiccant wheel may be in communication with the microturbine so as to use the waste heat for removing moisture therefrom. The system also may include a cooling system to cool the incoming air stream by a predetermined amount after the incoming air stream passes through the desiccant wheel.

A method of the present invention provides for conditioning ambient air. The method includes the steps of generating waste heat via a turbine, removing humidity from the ambient air with a desiccant system, regenerating the desiccant system with the waste heat, and cooling the ambient air to chilled air after the ambient air passes through the desiccant system. The method further may include the steps of conditioning a space with the chilled air and mixing the chilled air with the ambient air after the chilled air passes through the space.

These and other features of the present invention will become apparent upon review of the following detailed description of the invention when taken in conjunction with the drawings and the appended claims.

DETAILED DESCRIPTION

Figure 1:
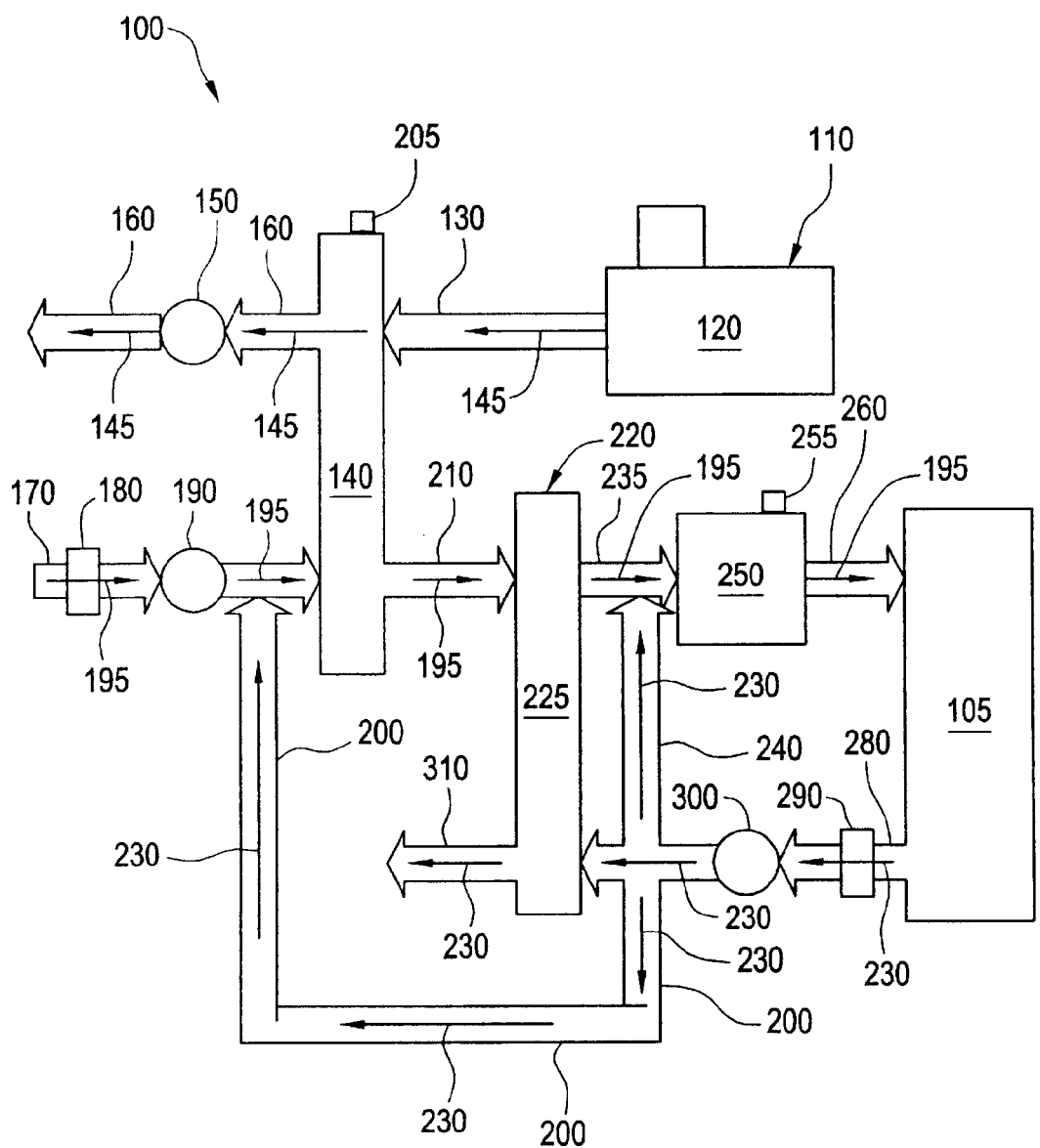
FIG. 1 is a schematic diagram of the system of the present invention.

Referring now to the figures, in which like numerals represent like elements, FIG. 1 shows a schematic view of an air-conditioning system 100 of the present invention. The air-conditioning system 100 may be used to cool a space 105. The space 105 may be a building or any type of enclosure generally served by a HVAC system. The nature or the dimensions of the space 105 do not limit the present invention.

The air-conditioning system 100 may include a heat source 110. In this example, the heat source 110 may be a turbine, and more specifically, the heat source 110 may be a microturbine 120. The microturbine 120 may be a natural gas turbine typically used for on-site power generation. For example, the microturbine 120 may be used as a backup or auxiliary power source for office buildings, retail stores, small manufacturing plants, homes, and many other types of facilities. These facilities traditionally have been powered by electrical utilities. By using the microturbine 120, however, these facilities may generate electrical power and avoid being solely dependent on conventional electrical power utilities. The microturbine 120 also may power the air-conditioning system 100 as a whole as well as the space 105.

The microturbine 120 may burn natural gas to produce electricity. As such, the microturbine 120 generally produces relatively clean exhaust gases. The exhaust gases may produce about seventeen percent (17%) oxygen ($O_2$) and less than about one percent (1%) carbon dioxide or carbon monoxide ($CO_2$ or CO). The microturbine 120 may generate waste heat at about 260° Celsius (about 500° F.). The temperature of the waste heat may depend on the operational pressure ratios and firing temperatures of the microturbine 120 as a whole.

A microturbine 120 useful with the present invention may be a microturbine sold under the mark "Parallon 75®" by General Electric Corporation of Schenectady, New York. Generally described, the "Parallon 75®" microturbine includes a turbine, a compressor, and a two-pole permanent magnetic generator rotor mounted on a single high-speed shaft via a number of air bearings. The "Parallon 75®" microturbine may generate about 75 kilowatts (75 kW) of electricity. Other microturbines 120 that may be useful with the present invention include a 30 to 60 kW microturbine sold by Capstone, Inc. of Chatsworth, Calif.; a 70 kW microturbine sold by Ingersoll-Rand, Inc. of Davidson, N.C. under the mark "Powerworks" and a microturbine sold by Elliott Turbomachinery Co., Inc. of Jeannette, Pa. Other types of microturbines and similar types of devices also may be used herein.

The heat generated by the microturbine 120 or other heat source 110 may be directed via one or more heat source ducts 130 as is described in more detail below. The heat source ducts 130 may be made out of steel, stainless steel, or similar types of materials. The heat source ducts 130 may be insulated and/or have good heat insulating capability.

The heat source duct 130 may direct the heat from the heat source 110 towards a desiccant wheel 140 positioned within a regeneration air stream 145. As described above, the desiccant wheel 140 may include finely divided desiccant material such as silica gels, titanium silicates, or some type of zeolite (a mineral containing hydrous silicates). The desiccant material may be impregnated into a fibrous support structure or otherwise be suspended. The desiccant wheel 140 uses heat from the heat source 110 to expel moisture trapped within the desiccant material. Specifically, the heat from the heat source 110 dries or regenerates the desiccant material as the desiccant wheel 140 rotates through the regeneration air stream 145. The desiccant material also may absorb pollution such as odors, carbon monoxide, etc. The air in the regeneration air stream 145 may be mixed with ambient outdoor air as the air stream 145 travels along the heat source duct 130 so as to reduce the temperature of the air before contact with the desiccant wheel 140.

Although the overall air-conditioning system 100 may operate with any type of conventional heat source 110, the use of the exhaust gas from the microturbine 120 may lead to increased efficiencies in that the exhaust gas is essentially "free". In other words, the microturbine 120 is going to produce the waste heat anyway. Harvesting this waste heat as opposed to powering a separate heat source thus may increase the overall efficiency of the air-conditioning system 100 and the space as a whole. Further, the use of the microturbine 120 generally promotes good air quality in that the waste heat is essentially "clean" or low in carbon monoxide or other types of noxious gases.

As the heat from the heat source 110 dries the desiccant material within the desiccant wheel 140, the regeneration air stream 145 may become moisture-laden. This hot moisture-laden air may be expelled out of the air-conditioning system 100 as a whole via a blower 150 or a similar type of device. The blower 150 may be any type of commercially available fan capable of relatively high temperature operations. The blower 150 may operate in conjunction with an exhaust duct 160 so as to remove the regeneration air stream 145 from the air-conditioning system 100 as a whole. The exhaust duct 160 may be made out of materials similar to those described above for the heat source duct 130.

Positioned on the opposite side of the desiccant wheel 140 from the heat source 110 may be an ambient air duct 170. The ambient air duct 170 may be made out of materials similar to those described above. The ambient air duct 170 may operate in conjunction with a filter 180 and a blower 190 to direct a stream of humid, ambient incoming air 195 from the environment towards the desiccant wheel 140. The filter 180 may be made out of paper, metal, or similar types of materials. The filter 180 may block the passage of large particles within the incoming air stream 195. The blower 190 may be similar to the blower 150 described above.

The ambient air duct 170 may merge with a recirculation air duct 200 so as to merge the incoming air stream 195 with at least a portion of a recirculation air stream as is described in more detail below. At least a partial mixing of the incoming and the recirculation air streams may limit the temperature and the humidity reduction requirements of the air-conditioning system 100 as a whole.

In the desiccant wheel 140, the incoming air stream 195 passes through the regenerated desiccant material. The desiccant material largely absorbs all or as much of the humidity within the incoming air stream 195 as is desired. The desiccant material generally has a low vapor pressure and absorbs the moisture until the desiccant material is saturated. Once saturated, the desiccant material should be spun into the regeneration air stream 145 from the heat source 110 and expelled via the exhaust duct 160 as described above. The amount of humidity to be removed may be adjusted by a humidity control system 205. The humidity control system 205 may be any type of standard control system.

The incoming air stream 195 now may be largely dehumidified. The air stream 195 then may be directed out of the desiccant wheel 140 via an internal duct 210. The internal duct 210 may be made out of materials similar to those described above.

The temperature of the incoming air stream 195 may be raised somewhat in the desiccant wheel 140 due to the regeneration air stream 145. The incoming air stream 195 therefore may then pass through a heat exchanger 220. In this case, the heat exchanger 220 may be in the form of a heat wheel 225. The heat wheel 225 is similar in concept to the desiccant wheel 140. Whereas the desiccant wheel 140 largely exchanged humidity between an incoming and outgoing air stream, the heat wheel 225 largely exchanges heat between an incoming and outgoing air stream. The heat wheel 225 also may be filled with various types of desiccant materials such as silicas or similar types of materials. In this case, heat is removed from the incoming air stream 195. The heat in the incoming air stream 195 is exchanged with a return air stream 230 as described in more detail below. Specifically, the desiccant material within the heat wheel 225 may absorb the heat in the incoming air stream 195.

As an alternative to the use of the heat wheel 225, another type of heat exchange structure may be used. For example, a conventional air-cooled heat exchanger or a similar type of structure may be used. Specifically, the chilled return air stream 230 may run through a series of heat exchange pipes while the incoming air stream 195 is passed thereover. Similar types of heat exchangers 220 also may be used.

The incoming air stream 195 may then exit the heat wheel 225 or any other type of air exchanger 220 via a further internal duct 235. The internal duct 235 may merge with a further recirculation duct 240 as is described in more detail below. The internal duct 235 and the recirculation duct 240 may be made out of materials similar to those described above for the other ducts. At least a partial mixing of the incoming and the recirculation air streams may limit the temperature and the humidity reduction requirements of the air-conditioning system 100 as a whole.

The internal duct 235 may lead the incoming air stream 195 towards a cooling device 250. The cooling device 250 may be any type of conventional cooling mechanism such as a cooling coil powered by a Rankine cycle system, an evaporative cooling system, an absorption cooling system, a heat pump, a desiccant cooling system, and the like. The cooling device 250 need only chill the incoming air stream 195 to the temperature desired for use in the space 105. Given that part or all of the humidity already has been removed from the air stream 195, the air does not need to be chilled below its dew point as is done in the conventional systems described above. The temperature of the air in the incoming air stream 195 as it exits the cooling device 250 may be adjusted by a temperature control system 255. The temperature control system 255 may be any type of control system. The system 100 as a whole allows for separate humidity and temperature controls.

The now chilled incoming air stream 195 may be directed out of the cooling device 250 by a supply duct 260. The supply duct 260 may be made out of materials similar to those described above. The incoming air stream 195 may then travel through the supply duct 260 into the space 105.

Once the space 105 has been conditioned as described above, the return air stream 230 may exit the space 105 via a return duct 280. The return duct 280 may be made out of materials similar to those described above. The return duct 280 may include a filter 290 and a blower 300. The filter 290 may be similar to the filter 180 described above. The blower 300 also may be similar to the blower 190 described above.

The return air stream 230 may partially pass through the heat wheel 225 so as to absorb the heat within the desiccant material from the incoming air stream 195 as is described above. Once the air in the return air stream 230 is heated within the heat wheel 225, the return air stream 230 may be exhausted via an exhaust duct 310. The exhaust duct 310 may be made out of materials similar to those described above. Part of the return air stream 230 also may travel through the recirculation duct 200 and merge with the ambient incoming air stream 145 within the ambient air duct 170 so as to reduce the heat and humidity within the incoming air stream 195 at that point. Likewise, part of the return air stream 230 may enter the further recirculation duct 240 as described above so as to further reduce the temperature of the incoming air stream 195 as it exits the heat wheel 225 and before entering the cooling device 250.

In use, the incoming air stream 195 enters the air-conditioning system 100 via the ambient air duct 170. Humidity within the incoming air stream 195 may be removed via the desiccant wheel 140. The desiccant material within the desiccant wheel 140 absorbs the humidity within the incoming air stream 195. As the desiccant material is saturated by the incoming humidity, the wheel 140 turns such that the saturated desiccant material meets the regeneration air stream 145 from the heat source 110 via the heat source duct 130. The heat source 110 may be the microturbine 120. The regeneration air stream 145 dries or regenerates the desiccant material such that the humidity is largely exhausted from the air-conditioning system 100 via the exhaust duct 160.

Because heat may be added to the incoming air stream 195 in the desiccant wheel 140, such excess heat may be removed in part within the heat wheel 225 or another type of heat exchanger 220. The incoming air stream 195 thus passes through the internal duct 210 towards the heat wheel 225. The desiccant material within the heat wheel 225 may absorb the heat from the incoming air stream 195 and exchange that heat with the cooler air in the return air stream 230.

After the heat from the dehumidified incoming air stream 195 has been reduced, the incoming air stream 195 may be merged with part of the return air stream 230 via the further recirculation duct 240. The return air stream 230 may balance the temperature and the humidity within the incoming air stream 195.

The incoming air stream 195 then may enter the cooling device 250 where it is chilled to a desired temperature. The chilled air may then circulate through the space 105 via the supply duct 260 and the return duct 280. The return air stream 230 is then again passed through the heat wheel 225 and exhausted through the exhaust duct 310 or recirculated via the recirculation ducts 200, 240. Power for the cooling device 250, rotation of the desiccant wheel 140, rotation of the heating wheel 225, and operation of the blowers 150, 300 may be provided by the microturbine 120. The microturbine 120 also may power the space 105 as a whole.

Figure 2:
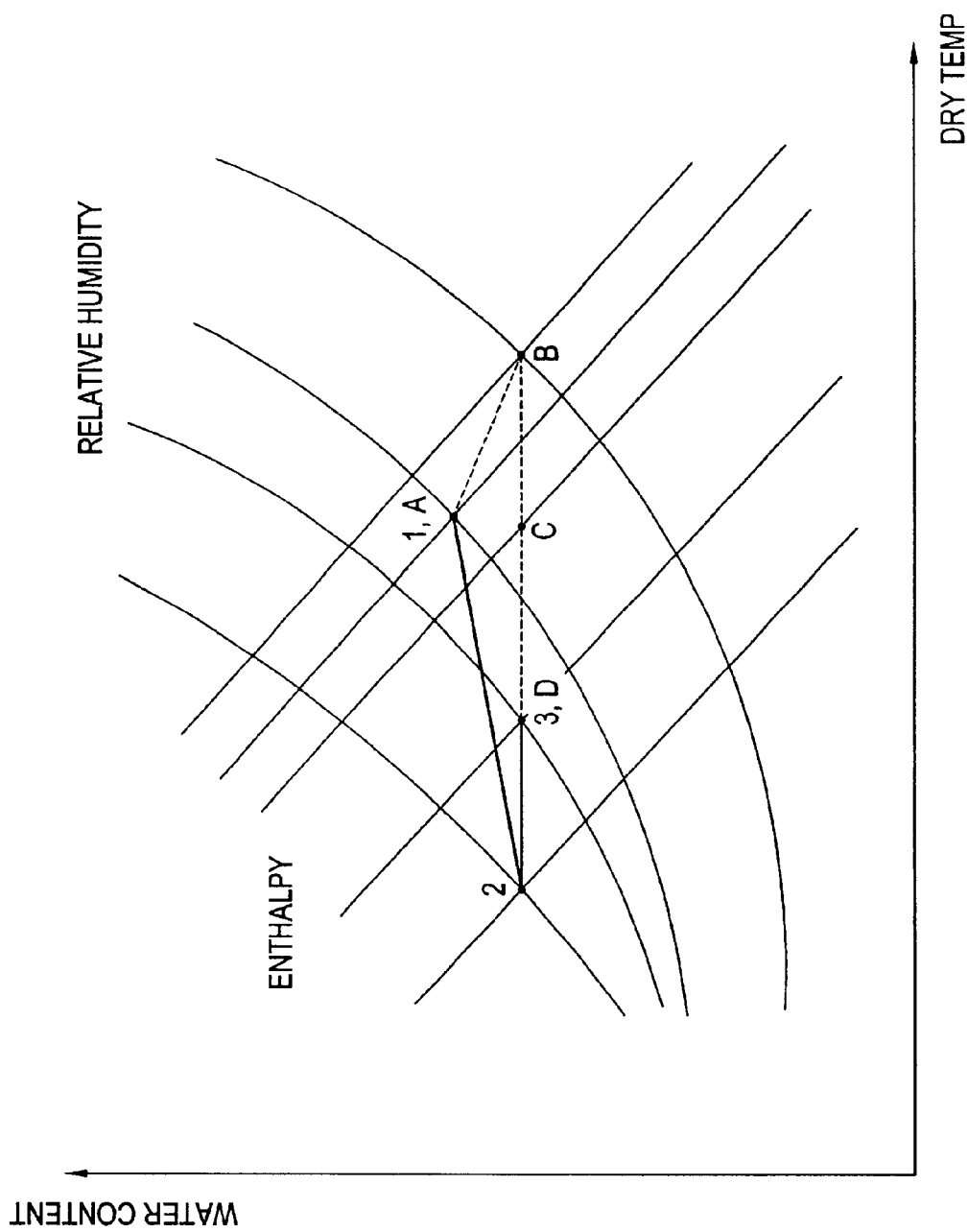
FIG. 2 is a chart of the enthalpy change for the system of the present invention as compared to traditional systems.

FIG. 2 charts the enthalpy change for a traditional air-conditioning system versus the air-conditioning system 100 of the present invention. As described above, in a conventional air-conditioning system the ambient air may have a higher relative humidity than is desired at Point 1. Energy is then used to chill the air beneath its dew point so as to reduce the humidity therein at Point 2. The air is then heated to a desired temperature at Point 3. In the air-conditioning system 100 herein, the ambient air also may have a higher relative humidity than is desired. This humidity may be removed via the desiccant wheel 140. The desiccant wheel 140, however, may raise the temperature of the ambient air stream at Point B. The temperature of the air stream may then be lowered in the heat wheel 225 using the return air stream at Point C and then brought to the desired temperature via the cooling device 250 at Point D. The change in enthalpy in the air-conditioning system 100 ($\Delta H = (H_c H_d)$) therefore should be less than the change in enthalpy in the traditional system ($\Delta H = (H_1 H_2) + (H_3 H_2)$).

The air-conditioning system 100, when used with the microturbine 120, therefore is more energy efficient and provides better humidity control than known systems. The air-conditioning system 100 provides improved temperature and humidity control because the latent and the sensible loads are handled separately in the desiccant wheel and the cooling coil. Furthermore, the air-conditioning system 100 can maintain lower humidity in the space I OS because of the use of the desiccant wheel 140. With lower humidity in the conditioned space 105, the overall temperature can be somewhat higher on the principles of effective temperature for the same level of comfort. The higher temperature of the space 105 thus may reduce the heat load on the air-conditioning system 100 as a whole in terms of less cooling and less energy consumption. Further, the air within the air-conditioning system 100 only needs to be reduced to its desired temperature as opposed to below its dew point so as to remove humidity. Also, the lower humidity may improve indoor air quality because the lower humidity generally limits the growth of bacteria.

It should be apparent that the foregoing relates only to the preferred embodiments of the present invention and that numerous changes and modifications may be made herein without departing from the spirit and scope of the invention as defined by the following claims and the equivalents thereof.

What is claimed is:

1. A system for conditioning air, comprising:
a microturbine for generating waste heat;
a desiccant system for removing humidity from the air;
said desiccant system in direct communication with said turbine so as to use the waste heat for regeneration; and
a cooling system to cool the air after the air passes through said desiccant system.

2. The system of claim 1, wherein said turbine comprises waste heat of about 150° to about 540° Celsius (about 300° to about 1000° F.).

3. The system of claim 1, wherein said desiccant system comprises a desiccant wheel.

4. The system of claim 1, further comprising one or more intake ducts so as to direct the air through said desiccant system add said cooling system and into a space for conditioning.

5. The system of claim 4, further comprising one or more return ducts so as to direct the air form said space.

6. The system of claim 5, further comprising one or more recirculation ducts positioned so as to direct the air from said one or more return ducts to said one or more intake ducts.

7. The system of claim 6, further comprising a heat exchanger positioned between said desiccant system and said cooling system so as to exchange heat between the air in said one or more intake ducts and said one or more recirculation ducts.

8. The system of claim 7, wherein said heat exchanger comprises a heat wheel.

9. The system of claim 8, wherein said heat wheel comprises a desiccant material.

10. The system of claim 1, wherein said cooling system comprises a cooling coil.

11. The system of claim 1, wherein said desiccant system comprises a humidity control system for adjusting the relative humidity level.

12. The system of claim 1, wherein said cooling system comprises a temperature control system for adjusting the temperature level.

13. The system of claim 1, wherein said turbine further generates electrical power.

14. An air system for conditioning ambient air for a predetermined space, comprising:
microturbine generation means for generating waste heat;
desiccant means for removing humidity from the ambient air;
said desiccant means in direct communication with said generation means so as to use the waste heat for regeneration; and
cooling means for cooling the ambient air after the ambient air passes through said desiccant means.

15. A method for conditioning ambient air:
generating waste heat via a microturbine;
removing humidity from the ambient air with a desiccant system;
regenerating the desiccant system directly with the waste heat; and
cooling the ambient air to chilled air after the ambient air passes through the desiccant system.

16. The method of claim 15, further comprising the step of conditioning a space with the chilled air.

17. The method of claim 16, further comprising the step of mixing the chilled air with the ambient air after the chilled air passes through the space.

18. An air-conditioning system, comprising:
a microturbine for generating electrical power and a waste heat stream;
an incoming air stream;
a desiccant wheel for removing humidity from said incoming air stream;
said desiccant wheel in direct communication with said microturbine so as to use said waste heat for removing moisture therefrom; and
a cooling system to cool said incoming air stream by a predetermined amount after said incoming air stream passes through said desiccant wheel.

* * * * *